(12) United States Patent
Addepalli

(10) Patent No.: US 12,073,253 B1
(45) Date of Patent: Aug. 27, 2024

(54) BITMAP-BASED RESOURCE MANAGERS

(71) Applicant: Amazon Technologies, Inc., Seattle, WA (US)

(72) Inventor: Meher Aditya Kumar Addepalli, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 523 days.

(21) Appl. No.: 17/363,903

(22) Filed: Jun. 30, 2021

(51) Int. Cl.
*G06F 9/50* (2006.01)

(52) U.S. Cl.
CPC .......... *G06F 9/5027* (2013.01); *G06F 9/5016* (2013.01)

(58) Field of Classification Search
CPC .............................. G06F 9/5027; G06F 9/5016
See application file for complete search history.

(56) References Cited

U.S. PATENT DOCUMENTS

| | | | | |
|---|---|---|---|---|
| 8,964,742 B1* | 2/2015 | Mizrahi | ............... | H04L 49/9015 370/385 |
| 10,303,671 B1* | 5/2019 | Addepalli | ........... | G06F 16/2246 |
| 10,552,480 B1* | 2/2020 | Stankowicz | .............. | G06F 8/61 |
| 2006/0212870 A1* | 9/2006 | Arndt | .................... | G06F 13/102 718/104 |
| 2009/0042581 A1* | 2/2009 | Liu | ........................ | H04L 5/0092 455/450 |
| 2012/0304189 A1* | 11/2012 | Tominaga | ............. | G06F 3/0637 718/104 |
| 2020/0322263 A1* | 10/2020 | Wu | ........................ | H04L 47/828 |
| 2021/0208924 A1* | 7/2021 | Krueger | ................ | G06F 3/0631 |
| 2022/0138153 A1* | 5/2022 | Yelheri | ............... | H04L 67/1095 707/649 |
| 2022/0405243 A1* | 12/2022 | Aithal | ................... | G06F 16/164 |
| 2022/0414102 A1* | 12/2022 | Shatsky | ............ | G06F 16/24552 |

* cited by examiner

*Primary Examiner* — Dong U Kim
(74) *Attorney, Agent, or Firm* — Nicholson De Vos Webster & Elliott LLP

(57) ABSTRACT

Bitmaps for managing computing resources are described. Example bitmaps described in this application use less memory space by varying the sizes of the nodes in the bitmap's tree structure, and/or by limiting the number of nodes in the bitmap's leaf layer. Other example bitmaps described in this application reduce the time needed to traverse the bitmap by tailoring the search direction according to the bitmap's configuration.

20 Claims, 9 Drawing Sheets

BITMAP-BASED RESOURCE MANAGERS

BACKGROUND

A computing device may use a bitmap to manage computing resources, such as memory blocks on a storage device. The bits in the bitmap correspond to the managed resources, and the state of each bit ("0" or "1") indicates whether the resource corresponding to that bit is available or allocated. For example, a "0" bit indicates that the resource corresponding to that bit is available, and a "1" bit indicates that the resource corresponding to that bit is allocated (or vice versa).

BRIEF DESCRIPTION OF DRAWINGS

Various embodiments in accordance with the present disclosure will be described with reference to the drawings, in which.

DETAILED DESCRIPTION

The present disclosure relates to the creation and use of more efficient bitmaps for managing computing resources. Some of the present embodiments achieve efficiencies in computing resource management using different configurations for bitmaps having tree structures. Bitmap trees according to some embodiments include multiple layers (may also be referred to as levels), where each layer includes one or more nodes, and each node has an index that facilitates accelerated bitmap lookups. For example, some embodiments include a root node and a leaf layer including one or more leaf nodes. Certain embodiments may also include one or more intermediate layers between the root node and the leaf layer, where each intermediate layer includes one or more intermediate nodes. Each leaf node includes a leaf index and bits that correspond to computing resources. The state of each bit in a leaf node indicates whether the corresponding computing resource is currently allocated or available (unallocated). Such bitmap trees can be referred to as hierarchical bitmaps, meaning that within each node in the root and intermediate layers, there is another bitmap. The state of each bit in these root and intermediate node bitmaps indicate whether there are any available resources in the child leaf nodes.

As described above, a computing device may use a bitmap to manage computing resources by maintaining the current states of the computing resources in the bitmap. Unfortunately, as the number of managed computing resources increases, so too does the amount of memory space needed to store the bitmap, and so too does the amount of time needed to search the bitmap for free resources and/or to allocate resources. As a result, computing devices may consume large amounts of computing resources during searches, allocations, and/or deallocations, thereby impairing the performance of the computing device.

Some embodiments according to the present disclosure solve these technical problems by leveraging flexible configurations for tree structure bitmaps. For example, bitmaps according to some embodiments use less memory space by varying the sizes of the nodes in the bitmap's tree structure and/or by limiting the number of nodes in the bitmap's leaf layer. In another example, bitmaps according to some embodiments reduce the time needed to traverse the bitmap by tailoring the search direction according to the bitmap's configuration. In yet another example, bitmaps according to some embodiments reduce memory access times by matching the lengths of the nodes in the bitmap's tree structure to the lengths of the cache(s) in the processor(s) of the computing device.

Figure 1:
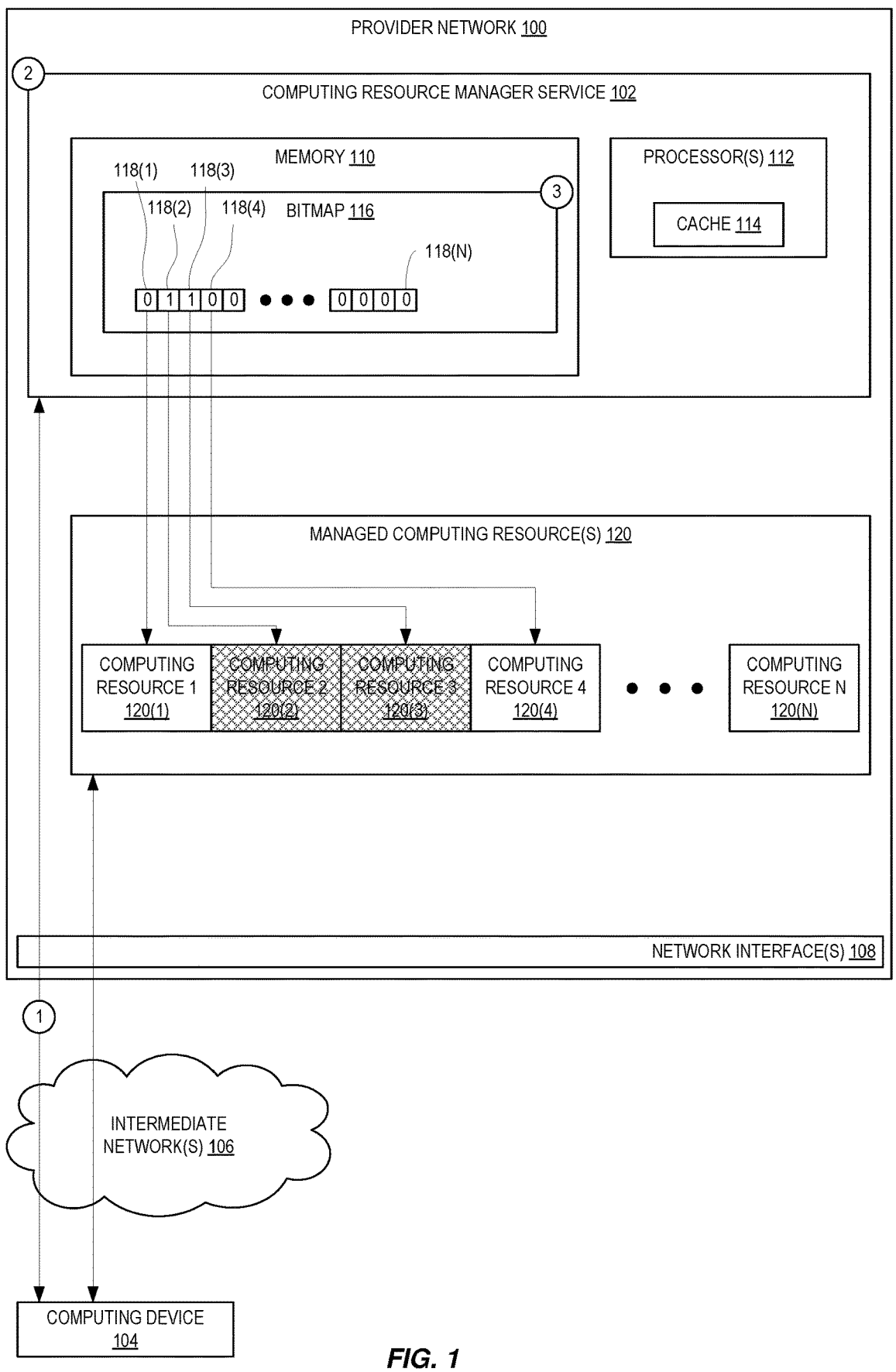
FIG. 1 is a block diagram illustrating an example environment for a bitmap-based resource manager according to some embodiments.

FIG. 1 is a block diagram illustrating an example environment for a bitmap-based resource manager according to some embodiments. The illustrated environment includes a provider network 100 hosting a computing resource manager service 102, among other services. One or more computing devices 104 (may also be referred to as client devices, user devices, or electronic devices) interact with the provider network 100 across one or more intermediate network(s) 106 (e.g., the internet) and one or more network interface(s) 108 (e.g., application programming interfaces).

A provider network (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks can use one or more user accounts that are associated with a customer account, though these terms can be used somewhat interchangeably depending upon the context of use. Users can interact with a provider network across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations, such as transferring customer data to and from the customer resources. The control plane components are typically implemented on a separate set of servers from the data plane servers, and control plane traffic and data plane traffic can be sent over separate/distinct networks.

To provide these and other computing resource services, provider networks often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

A hardware virtualization service (referred to in various implementations as an elastic compute service, a virtual machines service, a computing cloud service, a compute engine, or a cloud compute service) can enable users of the provider network to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service can be a container orchestration and management service (referred to in various implementations as a container service, cloud container service, container engine, or container cloud service) that allows users of the cloud provider network to instantiate and manage containers. In some embodiments the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

With reference to FIG. 1, in the illustrated embodiment the computing resource manager service 102 is shown as a standalone service. In some embodiments, the computing resource manager service 102 may be implemented as a library of an application (not shown) executed in the provider network 100. The computing resource manager service 102 includes memory 110 and one or more processor(s) 112. The memory 110 may be suitable memory technology, such as random-access memory (RAM), static RAM (SRAM), synchronous dynamic RAM (SDRAM), nonvolatile/Flash-type memory, or any other type of memory. The processor(s) 112 may be any suitable processor(s) capable of executing instructions, and may include one or several processors 112 (e.g., two, four, eight, or another suitable number). For example, the processor(s) 112 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 112 may, but not necessarily, implement the same ISA. The processor(s) 112 include a cache 114. Generally, a processor cache is a hardware cache used by the processor (e.g., a central processing unit (CPU)) to reduce the average cost (time and/or energy) to access data from the main memory. A cache is a smaller, faster memory, located closer to a processor core, that stores copies of the data from frequently used main memory locations.

The memory 110 stores instructions and data accessible by the processor(s) 112. In the illustrated embodiment, the memory 110 stores a bitmap 116 comprising a plurality of bits 118(1)-118(N). Each bit 118 in the bitmap 116 is associated with a managed computing resource 120(1)-120(N), with the state of the bit 118 indicating whether the corresponding computing resource 120(1)-120(N) is available or allocated. In some embodiments, a "0" state for a bit 118 indicates that the managed computing resource 120 corresponding to that bit 118 is available, and a "1" state for a bit 118 indicates that the managed computing resource 120 corresponding to that bit 118 is allocated, while in other embodiments a "0" state for a bit 118 indicates that the computing resource 120 corresponding to that bit 118 is allocated, and a "1" state for a bit 118 indicates that the computing resource 120 corresponding to that bit 118 is available. While not illustrated, the bitmap 116 may be a hierarchical bitmap that includes additional layers of nodes that include bitmaps indicating the state of the bits 118 in their child nodes, as described in further detail herein. For consistency and ease of understanding, the description in the present specification focuses on embodiments in which a "0" state for a bit 118 indicates that the computing resource 120 corresponding to that bit 118 is available, and a "1" state for a bit 118 indicates that the computing resource 120 corresponding to that bit 118 is allocated. For example, in the embodiment illustrated in FIG. 1, computing resource 1 120(1) (corresponding to bit 118(1)) and computing resource 4 120(4) (corresponding to bit 118(4)) are available, as indicated by the "0" state for bit 118(1) and bit 118(4), and computing resource 2 120(2) (corresponding to bit 118(2)) and computing resource 3 120(3) (corresponding to bit 118(3)) are allocated, as indicated by the "1" state for bit 118(2) and bit 118(3) (and by the cross-hatching inside the boxes representing computing resource 2 120(2) and computing resource 3 120(3)). It should be understood, however, that the present embodiments are not limited to this specific implementation, and implementations in which the bit indications are reversed (with a "0" state for a bit indicating an allocated computing resource and a "1" state for a bit indicating an available computing resource) are contemplated.

In various embodiments, the managed computing resources 120 may comprise memory blocks, ports, unique identifiers, indexes, addresses, or any other computing resource. For example, in some embodiments the computing resource manager service 102 may provide a block memory allocation service. At least a portion ("the block") of a memory of the managed computing resources 120 (and/or other memory within and/or outside of the provider network 100) may be pre-allocated and divided into fixed memory sub-blocks that are indexed. Memory addresses for each memory sub-block may then be generated from the index of each memory sub-block and the base memory address of the block. The bitmap 116 may then be used to manage the memory sub-blocks, thus acting as a superfast, low-overhead block allocator.

In some embodiments, the computing resource manager service 102 may provide an indexed resource management service. Any resources that can be indexed continuously, such as port space, for example, can be managed by the computing resource manager service 102. Each port number may be associated with a bit 118 in the bitmap 116, and the state of each bit 118 indicates whether the corresponding port is allocated or not.

With reference to FIG. 1, in the illustrated embodiment, the managed computing resources 120 are part of the provider network 100, but are outside of the computing resource manager service 102. In other embodiments, the managed computing resources 120 may be outside of the provider network 100. In still other embodiments, the managed computing resources 120 may be part of the computing resource manager service 102 within the provider network 100.

Figure 2:
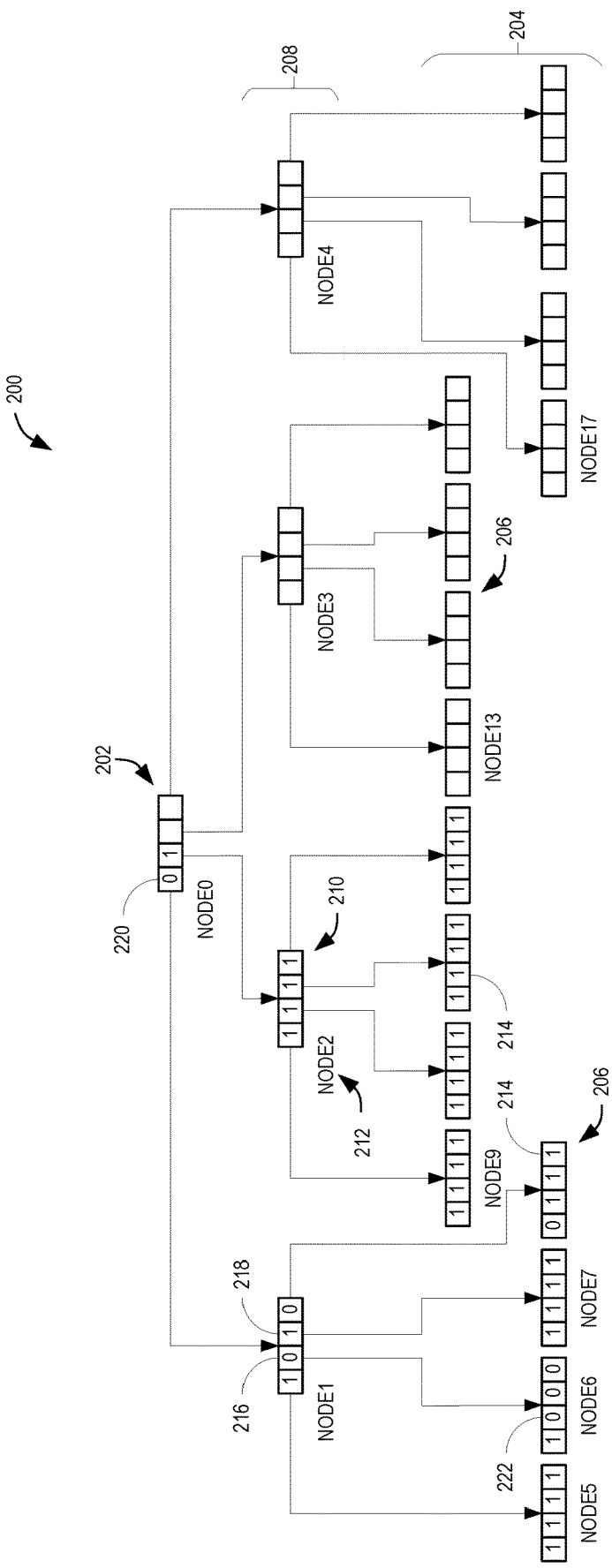
FIG. 2 is a block diagram illustrating an example bitmap having a tree structure according to some embodiments.

The computing resources 120 are numbered, and an index of each bit 116 in the bitmap 118 identifies the corresponding computing resource 120. With reference to FIG. 2, embodiments of the bitmap 118 comprise a tree structure including multiple layers (may also be referred to as levels). Each layer includes one or more nodes, and each node has an index that facilitates accelerated bitmap lookups. For example, the bitmap tree 200 illustrated in FIG. 2 includes a root node 202 and a leaf layer 204 including one or more leaf nodes 206. Certain embodiments may also include one or more intermediate layers 208 between the root node 202 and the leaf layer 204, where each intermediate layer 208 includes one or more intermediate nodes 210. Each leaf node 206 includes a leaf index 212 and bits 214 that correspond to computing resources (e.g., the managed computing resources 120). The state of each bit 214 indicates whether the corresponding computing resource is currently available or allocated (e.g., where a "0" state for a bit 214 indicates that the computing resource corresponding to that bit 214 is available, and a "1" state for a bit 214 indicates that the computing resource corresponding to that bit 214 is allocated).

In the example bitmap tree 200 of FIG. 2, each node 202, 210, 206 has four bits. The root node 202 and each of the intermediate nodes 210 has four child nodes, where a child node is a node corresponding to a node (a "parent" node) in the tree layer just above the tree layer of the child node. Since the leaf layer 204 is the lowermost layer of the bitmap tree 200, none of the leaf nodes 206 have any child nodes. The bitmap tree 200 of FIG. 2 is a "complete" tree, meaning that each node has the same number of bits, and each node, except the leaf nodes, has the same number of child nodes as the number of bits in each node.

With the bitmap tree 200 of FIG. 2, the bits in the leaf layer 204 (the lowermost layer of the tree) represent the states of the corresponding computing resources. For example, here the state of Resource1 (the first computing resource) is indicated by the left-most bit of Node5 (the first bit in the leaf layer 204, reading from left-to-right). Similarly, the third bit of Node16 (again, reading from left-to-right) indicates the state of Resource47 (the forty-seventh computing resource).

Advantageously, no pointers are needed to traverse this type of tree (where each node has the same number of bits, and each node, except the leaf nodes, has the same number of child nodes as the number of bits in each node), which reduces the memory overhead of managing the computing resource(s) 120. No pointers are needed because the indexes of the child nodes can be calculated from the index of the parent node, and the index of the parent node can be calculated from the indexes of each child node, as follows. Assigning the variable b to the number of bits in each node (which is also the number of child nodes that each parent node has), the child node indexes of a parent node with node index i are given by: $\{(b \times i+1), \ldots, (b \times i+b)\}$. For example, in the bitmap tree 200 of FIG. 2, where b=4, the child node indexes of Node3 are $\{(b \times i+1), \ldots, (b \times i+b)\} = \{(4 \times 3+1), \ldots, (4 \times 3+4)\} = \{13, 14, 15, 16\}$. The parent node index of a child node with node index i is given by: $(i-1) \div b$, and the bit index within the parent node is given by: $(i-1)\%b$, where the 0th index is the first bit, and where % represents the modulo operator. For example, in the bitmap tree 200 of FIG. 2, where b=4, the parent node index of Node13 is found by $(13-1) \div 4=3$, so the parent node index is 3 (Node3), and the bit index within the parent node is found by $13\%4=1$ (the second bit of Node3).

With a bitmap tree in which each node has the same number of bits, and each node, except the leaf nodes, has the same number of child nodes as the number of bits in each node (e.g., the bitmap tree 200 of FIG. 2), the process to derive the resource index from the bit index of each bit in the leaf nodes is as follows. The resource index of the resource corresponding to the first bit (Bit0) in the leaf layer is 0 (Resource0). If the total number of bits in the bitmap tree is $S_n$, and the total number of bits in the leaf layer is n, then the total number of bits in the bitmap tree excluding the leaf layer is $S_n - n$. Designating that value as o, then to convert a bit index (e.g., i) to a resource index (e.g., r): $r=i-o$. Similarly, to convert a resource index (e.g., r) to a bit index (e.g., i): $i=r+o$.

The state of each bit in the root node 202 and each of the intermediate nodes 210 indicates whether any of the respective child leaf nodes indicates resource availability. Thus, if a bit in the root node 202 or in an intermediate node 210 is in a "0" state, that means at least one bit in the corresponding child node is in a "0" state, and if a bit in the root node 202 or in an intermediate node 210 is in a "1" state, that means all bits in the corresponding child node are in a "1" state. For example, with reference to FIG. 2, the second bit 216 in Node1 is in a "0" state because at least one of the bits in Node6 is in a "0" state, while the third bit 218 in Node1 is in a "1" state because all of the bits in Node7 are in a "1" state. Further, if all the bits in Node0 are in a "1" state, that indicates the bitmap tree 200 is full (i.e., all the bits in the leaf layer 204 are in a "1" state). Thus, the values in the root and intermediate nodes can be considered as hierarchical bitmaps. Although FIG. 2 shows only one layer of intermediate nodes, it will be appreciated that various implementations can have one, two, or more layers of intermediate nodes.

The block diagram of FIG. 2 represents a logical structure of the bitmap tree 200 that aids the reader's understanding of how the bitmap tree 200 is organized in a logical sense. The illustrated tree configuration is not meant to imply that the physical locations for each bit in the memory 110 would be laid out in such a manner. Rather, in the memory 110 it is more likely that the bitmap tree 200 would be organized physically as a continuous string of memory locations. The present embodiments, however, are not limited to any physical arrangement of memory locations.

Among the advantages of the logical structure of the bitmap tree 200 is the speed with which the tree 200 can be traversed when searching for an available computing resource, when setting a computing resource as allocated, and when setting a computing resource as available. These processes are described with reference to FIG. 3, which also illustrates steps in a process for generating the bitmap tree 200.

Figure 3:
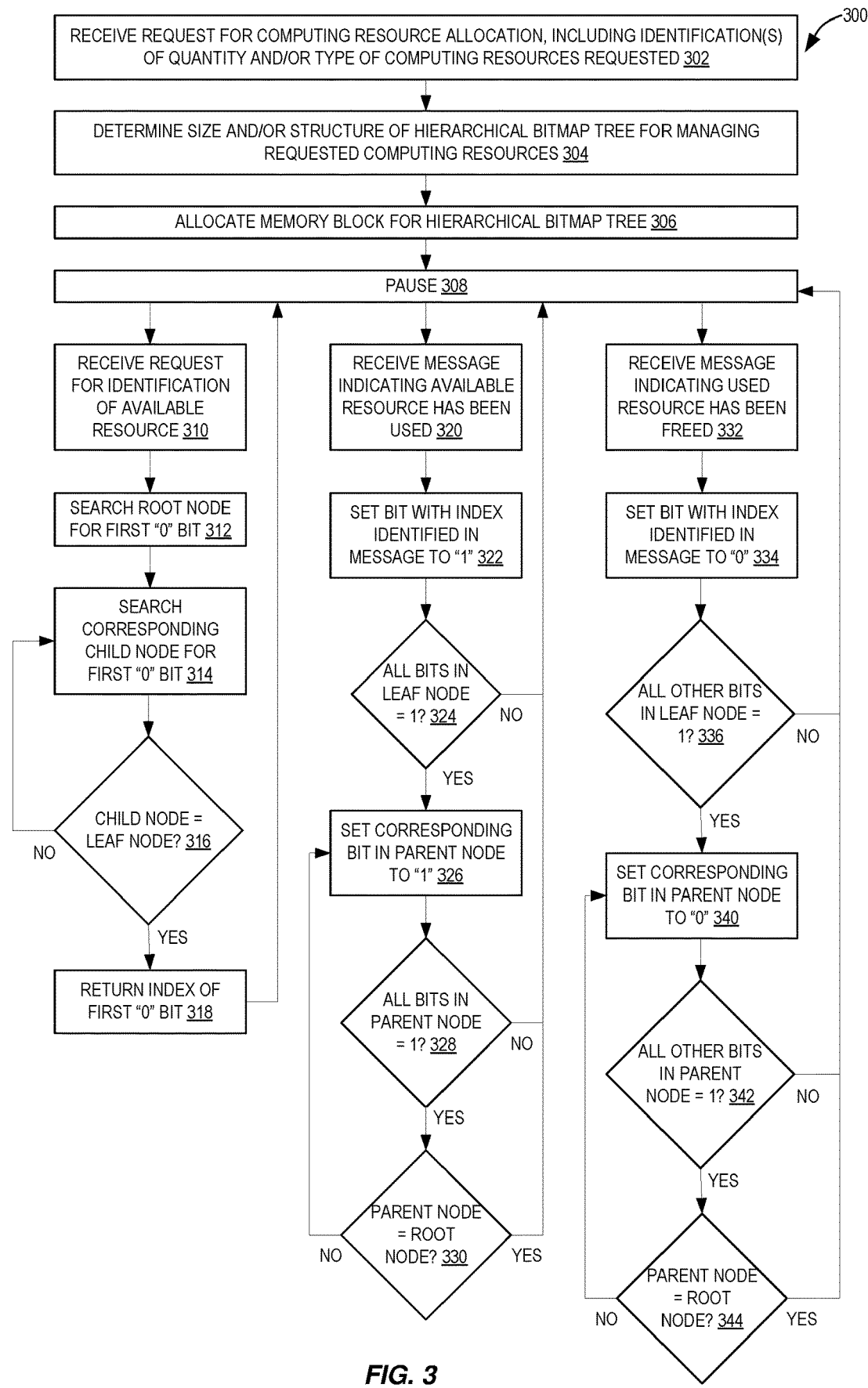
FIG. 3 is a flow diagram illustrating operations of an example method for using a bitmap to manage computing resources according to some embodiments.

FIG. 3 is a flow diagram illustrating operations 300 of a method for using a bitmap to manage computing resources according to some embodiments. Some or all of the operations 300 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 300 are performed by the computing resource manager service 102 of the other figures.

In the process 300 of FIG. 3, at block 302, a request is received for an allocation of computing resources. In some embodiments, the request may be received by the computing resource manager service 102 from the computing device(s) 104 via the intermediate network(s) 106 and the network interface(s) 108, as indicated at bubble "1" in FIG. 1. For example, an application (not shown) executing at the computing device(s) 104 may send the request to the computing resource manager service 102. The request may include identification(s) of at least one of the quantity or the type of computing resources requested. For example, the request may indicate that the computing device(s) 104 is requesting an allocation of 32 ports, or an allocation of 512 KB of memory space, or an allocation of any quantity of any other type of computing resources. In alternative embodiments, however, the quantity and/or type of computing resources requested may be provided another way, such as in one or more separate communications from the computing device(s) 104 to the computing resource manager service 102.

In the embodiment illustrated in FIG. 1, the request for an allocation of computing resources is received by the computing resource manager service 102 from the computing device(s) 104, which is/are outside the provider network 100. In some embodiments, however, the request for an allocation of computing resources may be received by the computing resource manager service 102 from a computing device (not shown) that is part of the provider network 100 and/or from an application (not shown) executing in the provider network 100.

With reference to FIG. 3, at block 304, a determination is made of the size and/or the structure of the bitmap tree that will be used for managing the requested computing resources. In some embodiments, the computing resource manager service 102 makes this determination based at least in part on information provided by the computing device(s) 104 in the request received at block 302, as indicated at bubble "2" in FIG. 1. For example, if the request indicates that the computing device(s) 104 is requesting an allocation of 64 ports, then the determination may be made that the size of the bitmap tree will be at least 64 bits, where the leaf layer will include exactly 64 bits so that the state (e.g., available or allocated) of each port can be indicated by a state of a corresponding one of the bits in the leaf layer.

For a bitmap tree with a leaf layer having 64 bits, there is more than one possible structure or configuration for the tree. For example, for b=4, a tree with three layers would have 64 bits in the leaf layer. More specifically, the root node would have 4 bits and 4 child nodes, so that the intermediate layer would have 4 nodes, each of which would have 4 bits and 4 child nodes, so that the leaf layer would have 16 nodes, each of which would have 4 bits for a total of 64 bits in the leaf layer. This configuration is illustrated in the bitmap tree 200 of FIG. 3. In another example, for b=2, a tree with six layers also would have 64 bits in the leaf layer. More specifically, the root node would have 2 bits and 2 child nodes, so that the first intermediate layer would have 2 nodes, each of which would have 2 bits and 2 child nodes, so that the second intermediate layer would have 4 nodes, each of which would have 2 bits and 2 child nodes, so that the third intermediate layer would have 8 nodes, each of which would have 2 bits and 2 child nodes, so that the fourth intermediate layer would have 16 nodes, each of which would have 2 bits and 2 child nodes, so that the leaf layer would have 32 nodes, each of which would have 2 bits for a total of 64 bits in the leaf layer.

When more than one value of b will provide the desired number of bits for the leaf layer, it is advantageous to choose a larger value for b, both because the memory overhead of the bitmap tree decreases as the value of b increases, and because larger values for b typically mean that the bitmap tree will have fewer layers, which reduces the time and/or complexity of traversing the tree. To illustrate the memory overhead advantage of some of the present embodiments, for any value of b, the total bits required for the bitmap tree (the memory overhead of the bitmap tree) is calculated according to Equation 1 as:

$$S_n = (b + b^2 + b^3 + \ldots + b^{\log_b n}) \quad \text{Equation 1}$$

$$S_n = \sum_{i=1}^{i=\log_b n} b^i = b\left(\frac{b^{\log_b n} - 1}{b - 1}\right) = \frac{b(n-1)}{b-1}$$

$$S_n = \left(\frac{b}{b-1}\right)(n-1)$$

where n is the desired number of bits for the leaf layer.

As the value of b increases, the value of $$\left(\frac{b}{b-1}\right)$$

approaches 1, so that the memory overhead of a bitmap tree with n bits in the leaf layer will always be lower for a larger value of b. To illustrate the low memory overhead advantage of a bitmap tree according to some of the present embodiments, consider a bitmap with n=4096 (4,096 bits in the leaf layer). Such a bitmap tree can be constructed with two layers, where b=64. The root node would have 64 bits and 64 child nodes, so that the leaf layer would have 64 nodes, each of which would have 64 bits for a total of 4,096 bits in the leaf layer. To manage this bitmap tree, the memory 110 would need only 4,160 bits:

$$\frac{64}{63} \times 4095 = 4160.$$

The time and/or complexity of traversing this tree with 4,160 bits and only two layers is very low, as described further below.

In some embodiments, the request received at block 302 may include information about a desired structure or configuration for the bitmap tree. For example, the request may specify one or more characteristics of the desired bitmap tree. These specified characteristics may include, without limitation, the number of layers in the bitmap tree, the size of each node in the bitmap tree (e.g., the value of b for bitmap trees in which all nodes have the same size), an indication that nodes at different layers of the bitmap tree should have different sizes and an indication of the size of each node within each layer, an indication that the leaf layer should be incomplete, etc. In embodiments in which one or more of these characteristics are specified in the request received at block 302, the determination made at block 304 may comprise simply extracting the specified characteristics from the request.

With reference to FIG. 3, at block 306, a memory block is allocated for the bitmap tree. In some embodiments, the computing resource manager service 102 allocates a block of the memory 110 based at least in part on the determination made at block 304 (regarding the size and/or the structure of the bitmap tree), as indicated at bubble "3" in FIG. 1. For example, continuing the illustrative example above, if the determination made at block 304 is that the bitmap tree with n=4096 will have b=64 and two layers, then the computing resource manager service 102 may allocate a block of the memory 110 having a size of 4,160 bits.

After the memory block is allocated for the bitmap tree, at block 306, the process 300 may pause, at block 308, and the computing resource manager service 102 may perform one or more further aspects of the process 300 illustrated in FIG. 3. Which of these aspects is performed next depends upon what type of request the computing resource manager service 102 next receives. For example, at block 310, the computing resource manager service 102 may receive a request for an identification of an available computing resource. The request may be received from the computing device(s) 104 via the intermediate network(s) 106 and the network interface(s) 108. At block 312, the computing resource manager service 102 searches the root node 202 of the bitmap tree 200 for the first bit having a "0" state. In some embodiments, the search may proceed from left-to-right across the memory locations of the bits of the root node 202 (as the bits are presented in FIG. 3). Proceeding in this direction, the first bit having a "0" state in the root node 202 is the first bit 220.

With reference to FIG. 3, at block 314, the computing resource manager service 102 then moves to the child node corresponding to the first bit having a "0" state in the root node 202, which in this example is Node1 (FIG. 1), and searches that node (from left-to-right) for the first bit having a "0" state. Proceeding in this direction, the first bit having a "0" state in the child node (Node1) is the second bit 216.

With reference to FIG. 3, at block 316, the computing resource manager service 102 determines whether this child node (the child node corresponding to the first bit having a "0" state in the node searched at block 312) is a leaf node. If the determination is made that this child node is not a leaf node, then the process 300 loops back and repeats block 314. The process 300 continues to iterate on blocks 314 and 316 until a leaf node is reached. Then, at block 318, the computing resource manager service 102 returns the index of the first bit having a "0" state in the leaf node, which in this example is the second bit 222 of Node6 (FIG. 1). The process 300 then returns to block 308.

With reference to FIG. 3, at block 320, the computing resource manager service 102 may receive a message indicating that a previously available computing resource has been used. For example, the computing device(s) 104 may send the message to the computing resource manager service 102, via the intermediate network(s) 106 and the network interface(s) 108. The message may indicate that the computing resource corresponding to the index of the bit returned at block 318 has been used. At block 322, the computing resource manager service 102 sets the bit with the index identified in the message received at block 320 to a "1" state, indicating that the computing resource corresponding to that bit has been allocated.

At block, 324, the computing resource manager service 102 determines whether all bits in the leaf node of the bit with the index identified in the message are in a "1" state. In one example, the bit that is set to a "1" state at block 322 is the second bit 222 of Node6 (FIG. 1). The computing resource manager service 102 in this example would thus determine whether all bits in Node6 are set to a "1" state. If the answer to this determination is "NO," then the process 300 returns to block 308. If, however, the answer to this determination is "YES," then the process 300 advances to block 326, where the computing resource manager service 102 sets to a "1" state the corresponding bit in the parent node of the bit that is set to a "1" state at block 322. Continuing the previous example, this bit is the second bit 216 in Node1 (FIG. 1).

With reference to FIG. 3, at block 328, the computing resource manager service 102 determines whether all bits in the parent node of the bit that was set to a "1" state in the previous step are set to a "1" state. If the answer to this determination is "NO," then the process 300 returns to block 308. If, however, the answer to this determination is "YES," then the process 300 advances to block 330, where the computing resource manager service 102 determines whether this parent node (the node of the bit that was set to a "1" state at block 326) is the root node.

If the determination is made that this parent node is not the root node, then the process 300 loops back and repeats block 326. The process 300 continues to iterate on blocks 326, 328, and 330 until either the bits in a parent node are determined to not all be in a "1" state at block 328, or until the root node is reached at block 330. In either case, the process 300 then returns to block 308. In some embodiments, the determination at block 330 (of whether this parent node is not the root node) may be made with reference to the index of that node, where, for example, the root node is Node0. Also in some embodiments, the determination at block 330 may be made with reference to the bit indexes of the bits of that node, where, for example, the bit indexes of the root node are in the range: {0, . . . , (w−1)}, inclusive, where w is the width of (the number of bits in) each node in the bitmap tree. In embodiments, described below, in which nodes at different layers of the bitmap tree have different widths, the determination at block 330 (of whether this parent node is not the root node) may be made with reference to the layer of that node, where, for example, the root node is always Layer0.

With reference to FIG. 3, at block 332, the computing resource manager service 102 may receive a message indicating that a previously allocated computing resource has been freed. For example, the computing device(s) 104 may send the message to the computing resource manager service 102, via the intermediate network(s) 106 and the network interface(s) 108. The message may indicate that the computing resource that was indicated to be used at block 320 has been freed. At block 334, the computing resource manager service 102 sets the bit with the index identified in the message received at block 332 to a "0" state, indicating that the computing resource corresponding to that bit is available.

At block 336, the computing resource manager service 102 determines whether all other bits in the leaf node (all bits other than the bit with the index identified in the message received at block 332) are in a "1" state. If the answer to this determination is "NO," then the process 300 returns to block 308. If, however, the answer to this determination is "YES," then the process 300 advances to block 340, where the computing resource manager service 102 sets to a "0" state the corresponding bit in the parent node of the bit that was set to a "0" state at block 334. If the answer to the determination at block 336 is "YES," then prior to setting the bit to a "0" state at block 334 all bits in the leaf node were in a "1" state, which in turn means that the bit in the parent node corresponding to the leaf node was also in a "1" state. Setting the bit in the leaf node to a "0" state at block 334 means that at least one bit in the leaf node is in a "0" state, which in turn means that the bit in the parent node corresponding to the leaf node must be changed to a "0" state to indicate that at least one resource corresponding to a bit in the leaf node is available.

With continued reference to FIG. 3, at block 342, the computing resource manager service 102 determines whether all other bits in the parent node (all bits other than the bit that was set to a "0" state at block 340) are in a "1" state. If the answer to this determination is "NO," then the process 300 returns to block 308. If, however, the answer to this determination is "YES," then the process 300 advances to block 344, where the computing resource manager service 102 determines whether this parent node (the node of the bit that was set to a "0" state at block 340) is the root node. If the determination is made that this parent node is the root node, then the process 300 returns to block 308. If, however, the answer to this determination is "NO," then the process 300 loops back and repeats block 340. The process 300 continues to iterate on blocks 340, 342, and 344 until either the bits in a parent node are determined to not all be in a "1" state at block 342, or until the root node is reached at block 344. In either case, the process 300 then returns to block 308.

In the process 300 described above, the bitmap tree is traversed in both a downward direction (from a parent node to a corresponding child node) and an upward direction (from a child node to a corresponding parent node). The process 300 thus includes determining the indexes of child nodes from the indexes of the corresponding parent nodes, and determining the indexes of parent nodes from the indexes of the corresponding child nodes. As described above, these determinations are made as follows. Assigning the variable b to the number of bits in each node (which is also the number of child nodes that each parent node has), the child node indexes of a parent node with node index i are given by: $\{(b \times i+1), \ldots, (b \times i+b)\}$. For example, in the bitmap tree 200 of FIG. 2, where b=4, the child node indexes of Node3 are $\{(b \times i+1), \ldots, (b \times i+b)\} = \{(4 \times 3+1), \ldots, (4 \times 3+4)\} = \{13, 14, 15, 16\}$. The parent node index of a child node with node index i is given by: $(i-1) = b$, and the bit index within the parent node is given by: $(i-1) \% b$, where the $0^{th}$ index is the first bit, and where % represents the modulo operator. For example, in the bitmap tree 200 of FIG. 2, where b=4, the parent node index of Node13 is found by $(13-1)=4=3$, so the parent node index is 3 (Node3), and the bit index within the parent node is found by 13%4=1 (the second bit of Node3).

Figure 4:
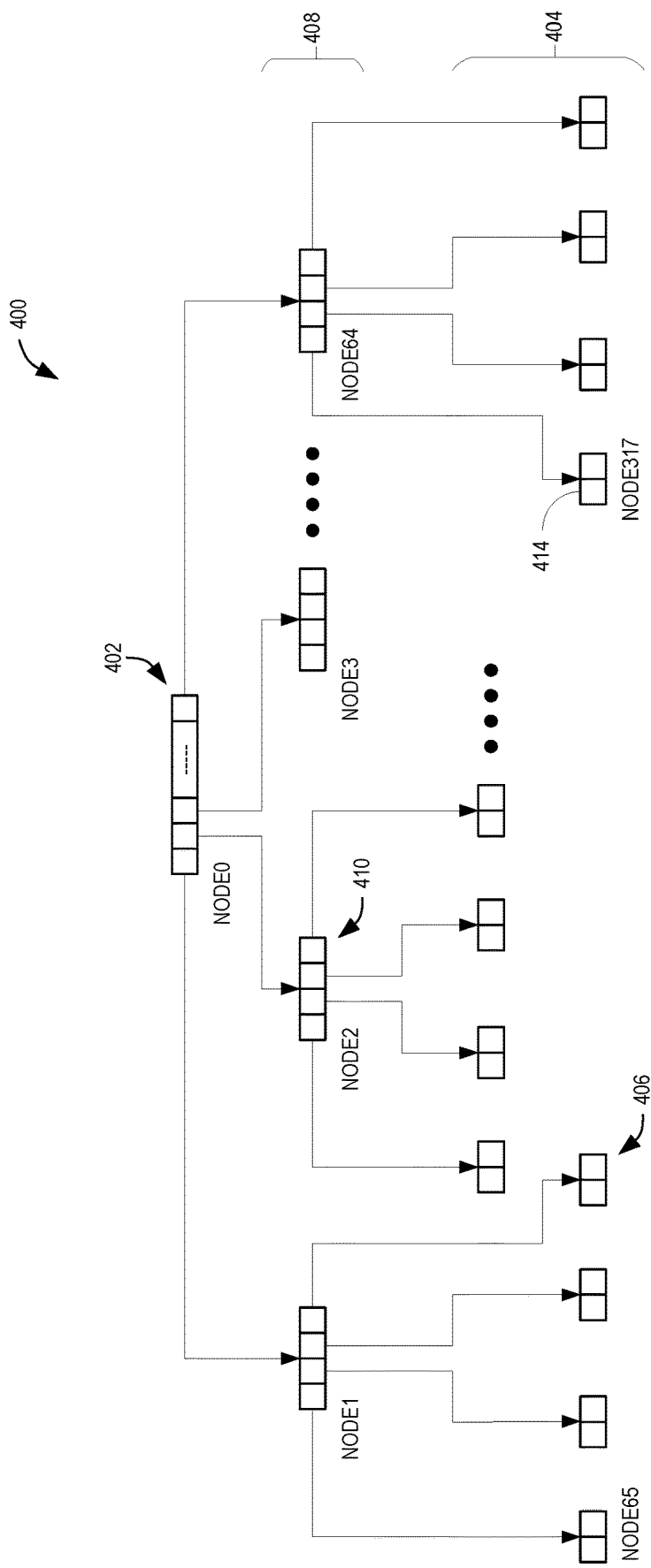
FIG. 4 is a block diagram illustrating another example bitmap having a tree structure according to some embodiments.

FIG. 4 is a block diagram illustrating another example bitmap having a tree structure according to some embodiments. In contrast to the bitmap tree 200 illustrated in FIG. 2, in the bitmap tree 400 illustrated in FIG. 4 not all nodes are the same size (not all nodes have the same number of bits). For example, a root node 402 includes 64 bits. For ease of illustration, not all 64 bits of the root node 402 are shown in FIG. 4. The bitmap tree 400 further includes a leaf layer 404 including one or more leaf nodes 406, and each of the leaf nodes 406 includes 2 bits. Certain embodiments may also include one or more intermediate layers 408 between the root node 402 and the leaf layer 404, where each intermediate layer 408 includes one or more intermediate nodes 410, and each of the intermediate nodes 410 includes 4 bits. It will be appreciated that the particular number of intermediate layers can vary in different implementations.

In the example bitmap tree 400 of FIG. 4, all nodes at the same layer of the tree 400 have the same number of bits. Thus, for example, all intermediate nodes 410 have 4 bits and all leaf nodes 406 have 2 bits. Further, for nodes that have child nodes, the number of bits for each node is equal to the number of child nodes for that node. Thus, for example, the root node 402 has 64 bits and 64 child nodes 410, and each intermediate node 410 has 4 bits and 4 child nodes 406. In alternative embodiments, however, all nodes at the same layer of the tree may not have the same number of bits, and/or for nodes that have child nodes the number of bits for each node may not be equal to the number of child nodes for that node.

Advantageously, bitmap trees in which the number of bits for each node varies across the layers of the tree (e.g., the bitmap tree 400 of FIG. 4) enable a wide range of desired bitmap sizes to be attained without generating excessive memory overhead, and without any need for extraneous bits. For example, to generate a bitmap tree with 8,192 bits in the leaf layer, one option is to use a tree having 13 layers in which each node has 2 bits ($2^{13}$=8,192). But this option generates a large amount of memory overhead. According to Equation 1 above, to manage this bitmap tree having 13 layers and 2 bits per node, the memory 110 would need 16,382 bits:

$$\frac{2}{1} \times 8191 = 16382.$$

By contrast, a tree with a root node having 64 bits and 64 child nodes (and thus 64 nodes in the intermediate layer), where each of the bits in the intermediate layer has only 2 child nodes, has 8,192 bits in the leaf layer and generates only 12,352 bits of memory overhead (64+4,096+8,192=12,352). Forcing the leaf layer to have 64 bits per node would generate a leaf layer with 262,144 bits (4096×64=262144), which includes a huge number of extraneous bits.

The block diagram of FIG. 4 represents a logical structure of the bitmap tree 400 that aids the reader's understanding of how the bitmap tree 400 is organized in a logical sense. The illustrated tree configuration is not meant to imply that the physical locations for each bit in the memory 110 would be laid out in such a manner. Rather, in the memory 110 it is more likely that the bitmap tree 400 would be organized physically as a continuous string of memory locations. The present embodiments, however, are not limited to any physical arrangement of memory locations.

In some embodiments, to traverse a bitmap tree having a varying number of bits for each node across the layers of the tree (e.g., the bitmap tree 400 of FIG. 4), a pointer might be used for the first bit in each layer. For example, a pointer may indicate the memory location of the first bit in the intermediate layer 408. The memory locations of the other bits in the intermediate layer 408 can then be calculated based on the characteristics of the bitmap tree 400, including the sizes of the nodes in each layer. For example, in some embodiments the starting bit (e.g., the left-most bit) in each layer may have bit index 0 (Bit0). Then, to traverse the bitmap tree from top to bottom, let the index of the first bit in the root node having a "0" state be $i_0$. Then the child of that bit is the $i_0$ node in the next (lower) layer. The structure of the bitmap tree provides the width of each node (e.g., $w_1$). The range of the child node is then: $\{(w_1 \times i_0), \ldots, (w_1 \times i_0 + w_1 - 1)\}$. These steps are then recursively applied to continue traversing downward in the bitmap tree until the leaf node is reached. Similarly, to traverse the bitmap tree toward the root node, divide the bit index at the current layer by the bit width of the node of that layer (as specified by the structure of the bitmap tree). For example, let $i_3$ be the bit index of the third layer and $w_3$ be the bits per node for that layer. Then the parent node index is given by $i_3 \div w_3$, and the parent bit index within the node is given by $i_3 \% w_3$, where % represents the modulo operator.

With a bitmap tree having a varying number of bits for each node across the layers of the tree (e.g., the bitmap tree 400 of FIG. 4), there is advantageously no need to convert the bit indexes of any bits in the leaf nodes to obtain the corresponding resource indexes. Rather, the bit index of each bit in the last layer of the bitmap tree is the resource index of the resource corresponding to that bit.

Figure 5:
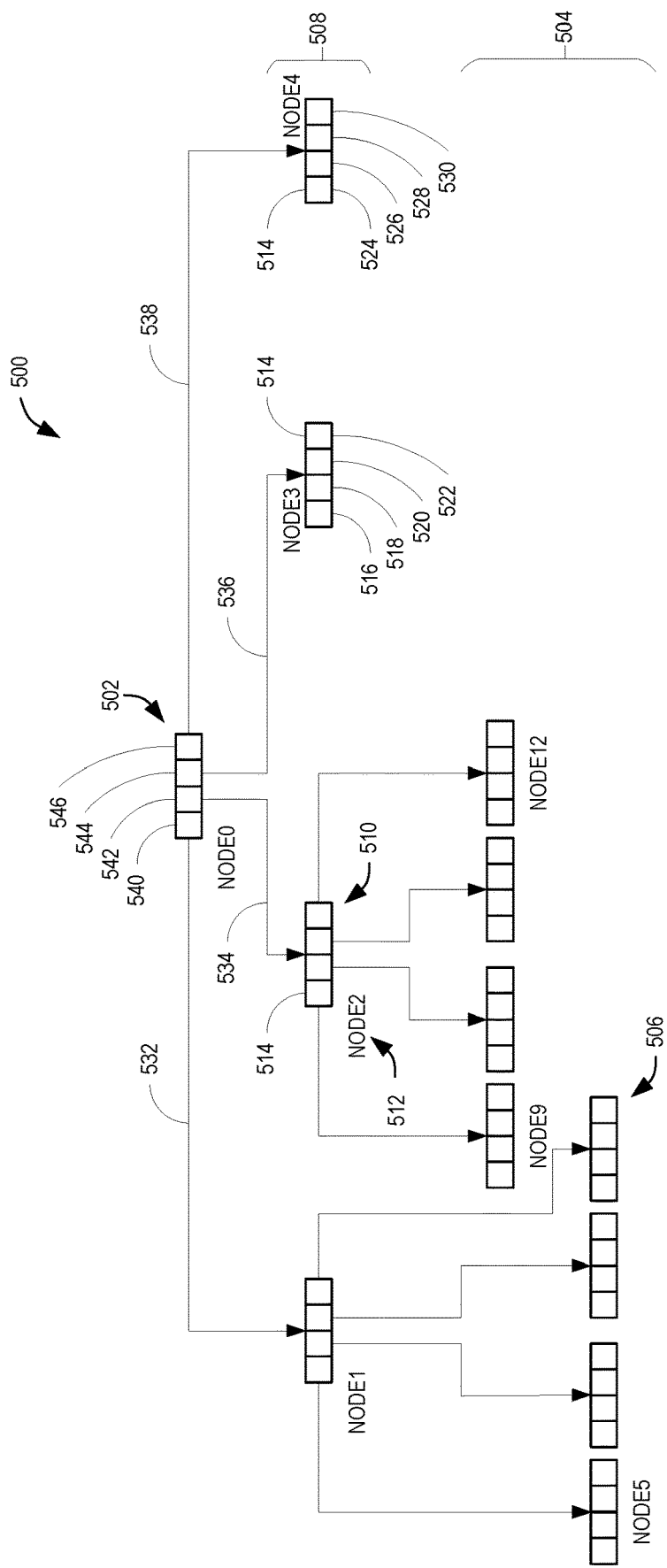
FIG. 5 is a block diagram illustrating another example bitmap having a tree structure according to some embodiments.

FIG. 5 is a block diagram illustrating another example bitmap having a tree structure according to some embodiments. In this embodiment, similar to the bitmap tree 200 illustrated in FIG. 2, in the bitmap tree 500 illustrated in FIG. 5 all nodes are the same size (all nodes have the same number of bits). The bitmap tree 500 further includes a leaf layer 504 including one or more leaf nodes 506, and one or more intermediate layers 508 between the root node 502 and the leaf layer 504, where each intermediate layer 508 includes one or more intermediate nodes 510. However, in contrast to the bitmap tree 200 illustrated in FIG. 2, in the bitmap tree 500 illustrated in FIG. 5 not all intermediate nodes 510 have child nodes. In particular, each of Node1 and Node2 has 4 child nodes, while each of Node3 and Node4 has no child nodes.

Similar to previously described embodiments, each leaf node 506 includes a leaf index 512 and bits 514 that correspond to computing resources (e.g., the managed computing resources 120), and the state of each leaf node bit 514 indicates whether the corresponding computing resource is currently available or allocated. However, in contrast to previously described embodiments, the intermediate nodes 510 that have no child nodes, which in the illustrated example includes Node3 and Node4, also include bits 516 that correspond to computing resources (e.g., the managed computing resources 120), and the state of each of these intermediate node bits 516 indicates whether the corresponding computing resource is currently available or allocated. In some embodiments, Node3 and Node4 in the bitmap tree 500 illustrated in FIG. 5 may be referred to as leaf nodes, even though they are located in the intermediate layer(s) 508. A bitmap tree such as the tree 500 illustrated in FIG. 5 may be referred to as an incomplete leaf layer tree or as an incomplete last level tree, for example.

In the embodiments described with reference to FIGS. 2 and 4, only the nodes in the leaf layers 204, 404 include bits 214, 414 that correspond to computing resources, whereas in the incomplete leaf layer tree 500 illustrated in FIG. 5 the nodes that correspond to computing resources are split across multiple layers 504, 508. Incomplete leaf layer trees are advantageous for instances where the number of computing resources to be managed cannot be expressed as $x^y$, where both x and y are integers. With trees of this type, the allocation and/or de-allocation of computing resources may be similar to the techniques described above with respect to the bitmap trees 200, 400, except that the first bit (the left-most bit as represented in FIG. 5) of the leaf layer in an incomplete leaf layer tree does not map to the first computing resource. Rather, the first bit (the left-most bit) 516 of Node3 maps to the first computing resource (Resource1). The second, third, and fourth bits (reading from left-to-right) 518, 520, 522 of Node3 map to the second, third, and fourth, respectively, computing resources (Resource2, Resource3, Resource4). The first, second, third, and fourth bits (reading from left-to-right) 524, 526, 528, 530 of Node4 map to the fifth, sixth, seventh, and eighth, respectively, computing resources (Resource5, Resource6, Resource7, Resource8). Similarly, the bits in the leaf layer nodes (Node5 through Node12) map, from left-to-right, to the ninth through fortieth, respectively, computing resources (Resource9 through Resource40).

In the incomplete leaf layer tree 500, the right side of the tree 500, comprising Node3 and Node4, is incomplete (has no nodes in the leaf layer 504). This configuration is merely one illustrative example, and is not in any way limiting. In alternative embodiments, incomplete leaf layer trees may have an incomplete left side and a complete right side, or complete left and right sides with an incomplete center portion. Embodiments in which incomplete portions appear at any location(s) on the bitmap tree are contemplated. Further, the ratio of complete branches to incomplete branches could have any value. In the incomplete leaf layer tree 500, first and second tree branches 532, 534 are complete, while third and fourth tree branches 536, 538 are incomplete, for a ratio of 1:1. In alternative embodiments, the ratio of complete branches to incomplete branches could 1:2, or 1:2.5, or 1:2.75, or 1:3, or 1:4, or 2:1, or 2.5:1, or 2.75:1, or 3:1, or 4:1, or any other value.

The block diagram of FIG. 5 represents a logical structure of the bitmap tree 500 that aids the reader's understanding of how the bitmap tree 500 is organized in a logical sense. The illustrated tree configuration is not meant to imply that the physical locations for each bit in the memory 110 would be laid out in such a manner. Rather, in the memory 110 it is more likely that the bitmap tree 500 would be organized physically as a continuous string of memory locations. The present embodiments, however, are not limited to any physical arrangement of memory locations. Further, references to bit locations, such as "left-most" or "right-most," and to search directions/progressions, such as "right-to-left" or "left-to-right," are made with reference to the logical layouts of the bitmap tree 500 as represented in FIG. 5. These locational and directional terms are not necessarily meant to be applied in a literal sense to any physical memory locations, although in some cases they might be. Rather, a left-to-right search of the bitmap tree 500 as represented in FIG. 5 would correspond to a search progression that moves from the side of the tree that has a complete leaf layer toward the side of the tree that has an incomplete leaf layer. Conversely, a right-to-left search of the bitmap tree 500 as represented in FIG. 5 would correspond to a search progression that moves from the side of the tree that has an incomplete leaf layer toward the side of the tree that has a complete leaf layer. In other embodiments in which the layout of the tree is reversed, these directional terms may similarly be reversed.

Advantageously, incomplete leaf layer trees (e.g., the bitmap tree 500 of FIG. 5) enable a wide range of desired bitmap sizes to be attained without any need for extraneous bits, which in turn reduces the memory overhead of such trees. For example, the incomplete leaf layer tree 500 illustrated in FIG. 5 includes 40 bits (in Node3 through Node12) that map to computing resources (Resource1 through Resource40). 40 is a number that cannot be expressed as $x^y$, where both x and y are integers. Thus, to generate a bitmap tree to manage 40 computing resources, other techniques would require a leaf layer with more than 40 bits. For example, a tree having 6 layers in which each node has 2 bits ($2^6 = 64$) would work, as would a tree having 3 layers in which each node has 4 bits ($4^3 = 64$). But these options both result in a leaf layer having 64 bits, so that 24 of those bits are unneeded. These options therefore generate unnecessary memory overhead.

Incomplete leaf layer trees (e.g., the bitmap tree 500 of FIG. 5) also have the further advantage that some computing resource allocations (and de-allocations) are faster due to the reduced depth of some branches of the tree. For example, with reference to FIG. 5, the depth of the tree branches 532, 534 that include Node1 and Node2 is 3 layers (including the root node 532, the intermediate layer 508, and the leaf layer 504), while the depth of the tree branches 536, 538 that include Node3 and Node4 is only 2 layers (including the root node 532 and the intermediate layer 508). Computing resource allocation (and de-allocation) operations for those computing resources that correspond to the bits of Node3 and Node4 are faster, because those operations only need to traverse 2 layers of the bitmap tree 500. For example, when a request for an available resource is received, the computing resource manager service 102 would search Node0 and, if either of the third or fourth bits 544, 546 were in a "0" state, the computing resource manager service 102 would then search either Node3 or Node4 (depending upon which of the third or fourth bits 544, 546 was in a "0" state) for the first "0" state bit. Upon finding that bit, the computing resource manager service 102 would return the index of that bit. By contrast, again in response to a request for an available resource, the computing resource manager service 102 would search Node0 and, if either of the first or second bits 540, 542 were in a "0" state, the computing resource manager service 102 would then search either Node1 or Node2 (depending upon which of the first or second bits 540, 542 was in a "0" state) for the first "0" state bit. Upon finding that bit, the computing resource manager service 102 would next have to search one of Node5 through Node12 (again, depending upon which bit in Node1 or Node2 was in a "0" state) for the first "0" state bit. Upon finding that bit, the computing resource manager service 102 would return the index of that bit. This search, which traverses all three layers 500, 504, 508 of the bitmap tree 500 would take longer than the search described above that only traverses the top two layers 500, 504 of the bitmap tree 500.

In some embodiments, search operations (as well as allocation/de-allocation operations) in the bitmap tree 500 can be further accelerated by traversing each node from right-to-left, rather than the left-to-right search technique described above. For example, with reference to FIG. 5, when a request for an available resource is received, the computing resource manager service 102 would search Node0 from right-to-left. If the fourth bit 546 were in a "0" state, the computing resource manager service 102 would then search Node4, again from right-to-left, for the first "0" state bit. Upon finding that bit, the computing resource manager service 102 would return the index of that bit. If the fourth bit 530 in Node4 were in a "0" state, the computing resource manager service 102 would return the index of that bit after having only searched two bits of the entire bitmap tree 500. Even if all the bits in Node3 and Node4 were in a "1" state except the first bit 516 in Node3, the computing resource manager service 102 would still only have to search six bits (546, 544, 522, 520, 518, 516) of the entire bitmap tree 500 to find the first bit in a "0" state.

As described above, in some embodiments incomplete leaf layer trees may have an incomplete left side and a complete right side. In such embodiments, accelerated search/allocation/de-allocation operations would be achieved by traversing each node from left-to-right.

In some embodiments, the sizes of the nodes in the bitmap tree may be set according to the length of the cache line size of the cache 114 of the processor(s) 112 (FIG. 1). Generally, processor caches are organized in lines, and each cache line is the minimum unit of memory that is loaded and accessed in the cache. If a data object is split across a cache line boundary, so that a first part of the data object is stored in a first cache line and a second part of the data object is stored in a second cache line, then two cache line access operations are needed to access that data object, even when the data object size is less than the cache line length. Thus, memory access operations for cache misaligned data objects are twice as costly as for cache aligned ones (assuming the size of the data object is less than the cache line size).

To enhance the efficiency of cache access operations, some of the present embodiments set each node of the bitmap tree to be cache-aligned, such that no single node occupies more than one cache line. Cache alignment advantageously reduces cache line loads (requests to copy data from RAM to a cache) by 50%, because no nodes are split across multiple cache lines. Cache alignment also advantageously also reduces cache misses (requests to retrieve data from a cache) by 50%, because there is no need to retrieve data from multiple cache lines to determine the states of the bits in a single node. Also to enhance the efficiency of cache access operations, some of the present embodiments set the size of the leaf layer to be a whole number multiple of the cache line length. For example, if the cache line length is 16 words, then the size of the leaf layer could be a whole number multiple of 64 bits, such as 64 bits, or 128 bits, or 256 bits, or 512 bits, etc.

The bitmap tree 500 of FIG. 5 may provide variable performance cost, depending upon which nodes of the tree are being accessed. For example, managing the computing resources associated with Node3 requires two cache misses, because Node3 is on the intermediate layer 508, while managing the computing resources associated with Node9 requires three cache misses, because Node9 is on the leaf layer 504. In some implementations, this variable performance cost may be desirable, because of the faster performance achieved when accessing Node3 and Node4. However, in some embodiments it may be desirable to have a fixed performance cost. In such embodiments, it may be preferable to use a bitmap tree having the structure of the bitmap tree 400 of FIG. 4 in which the leaf layer 404 is complete.

In some embodiments, features of the various embodiments described above may be combined. For example, the bitmap tree 400 of FIG. 4 includes nodes of varying sizes, and the bitmap tree 500 of FIG. 5 includes an incomplete leaf layer. In some embodiments these features may be combined to generate a bitmap tree having both nodes of varying sizes and an incomplete leaf layer.

Figure 6:
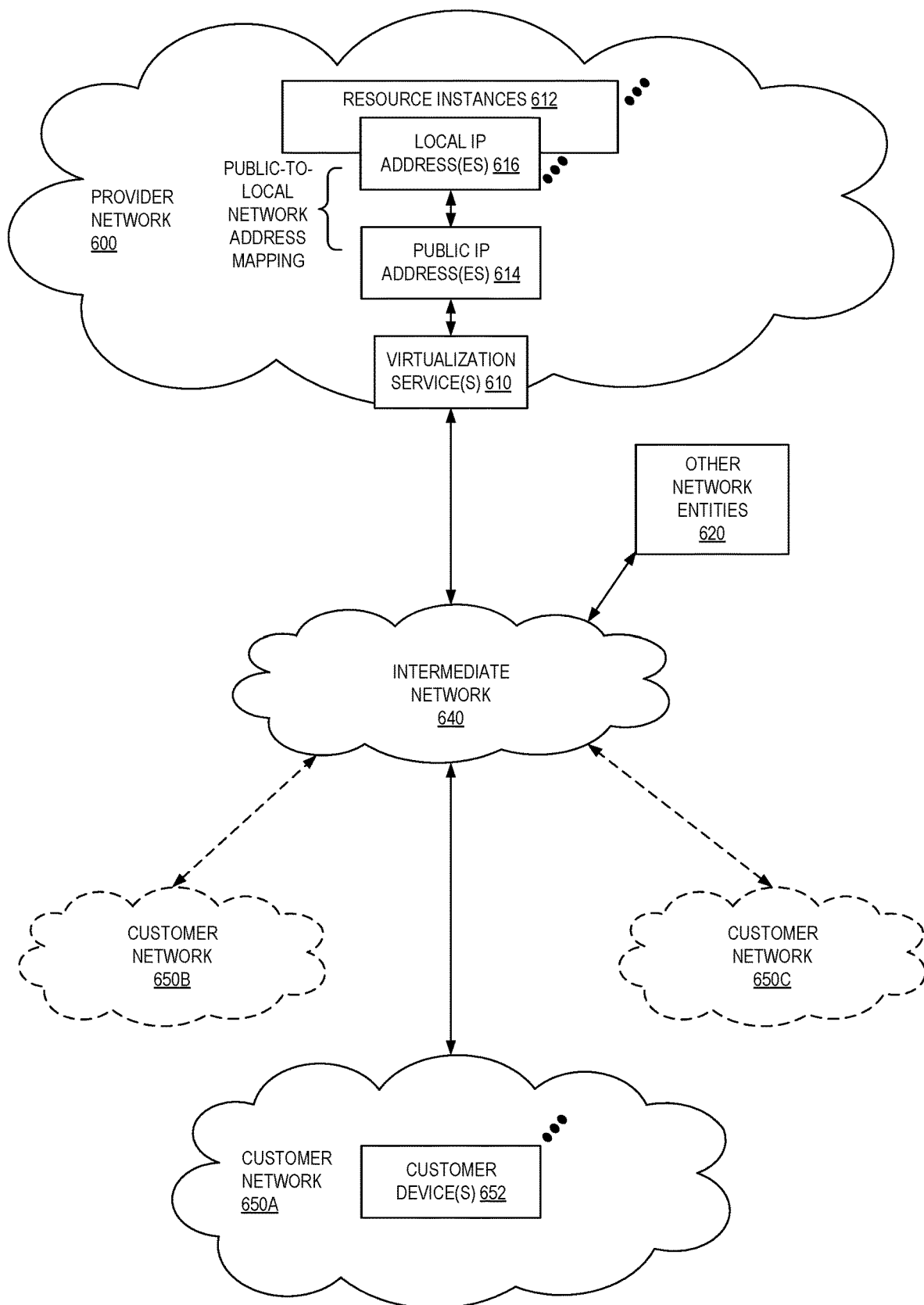
FIG. 6 is a block diagram illustrating an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4

(IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
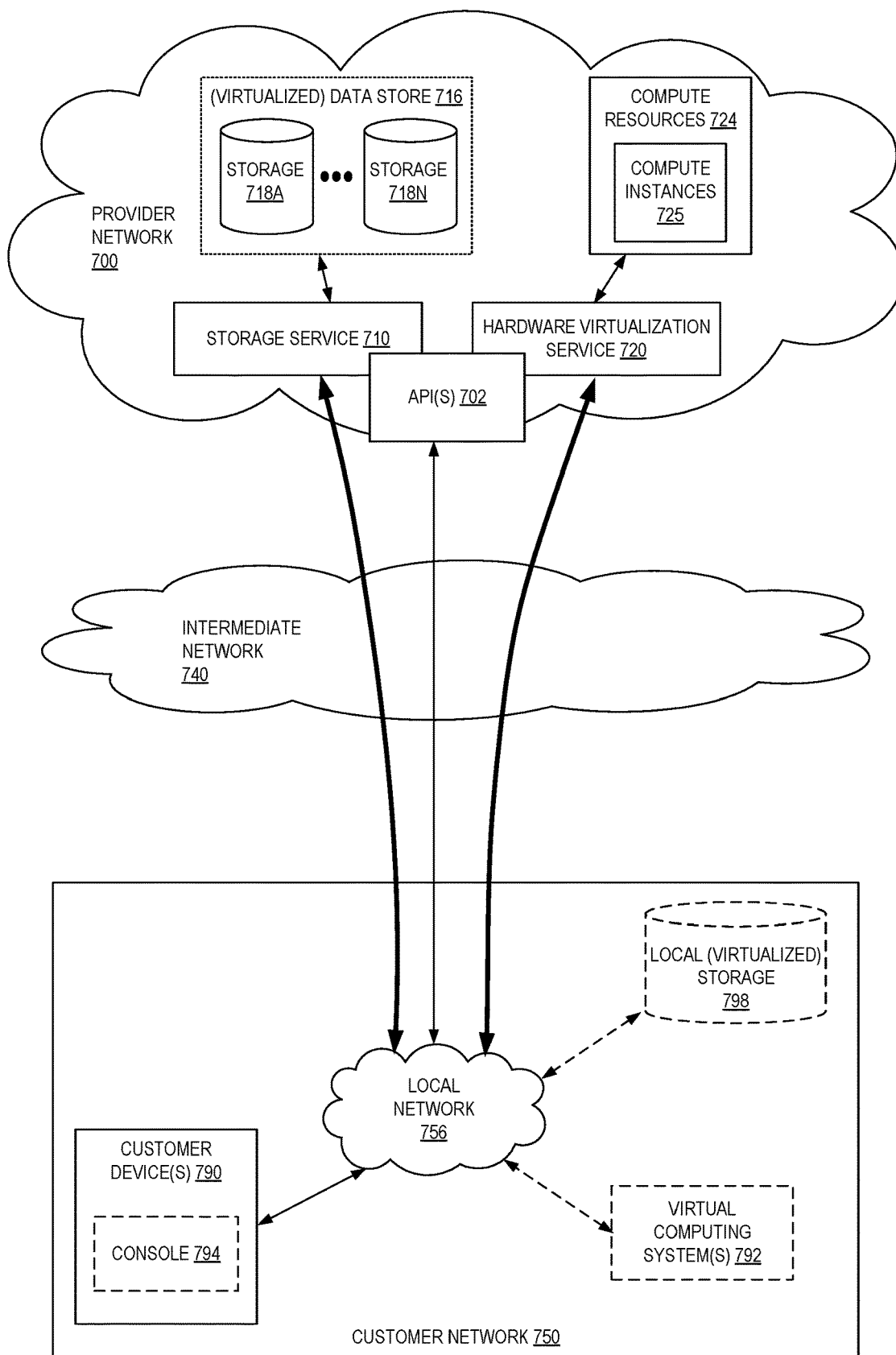
FIG. 7 is a block diagram illustrating an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
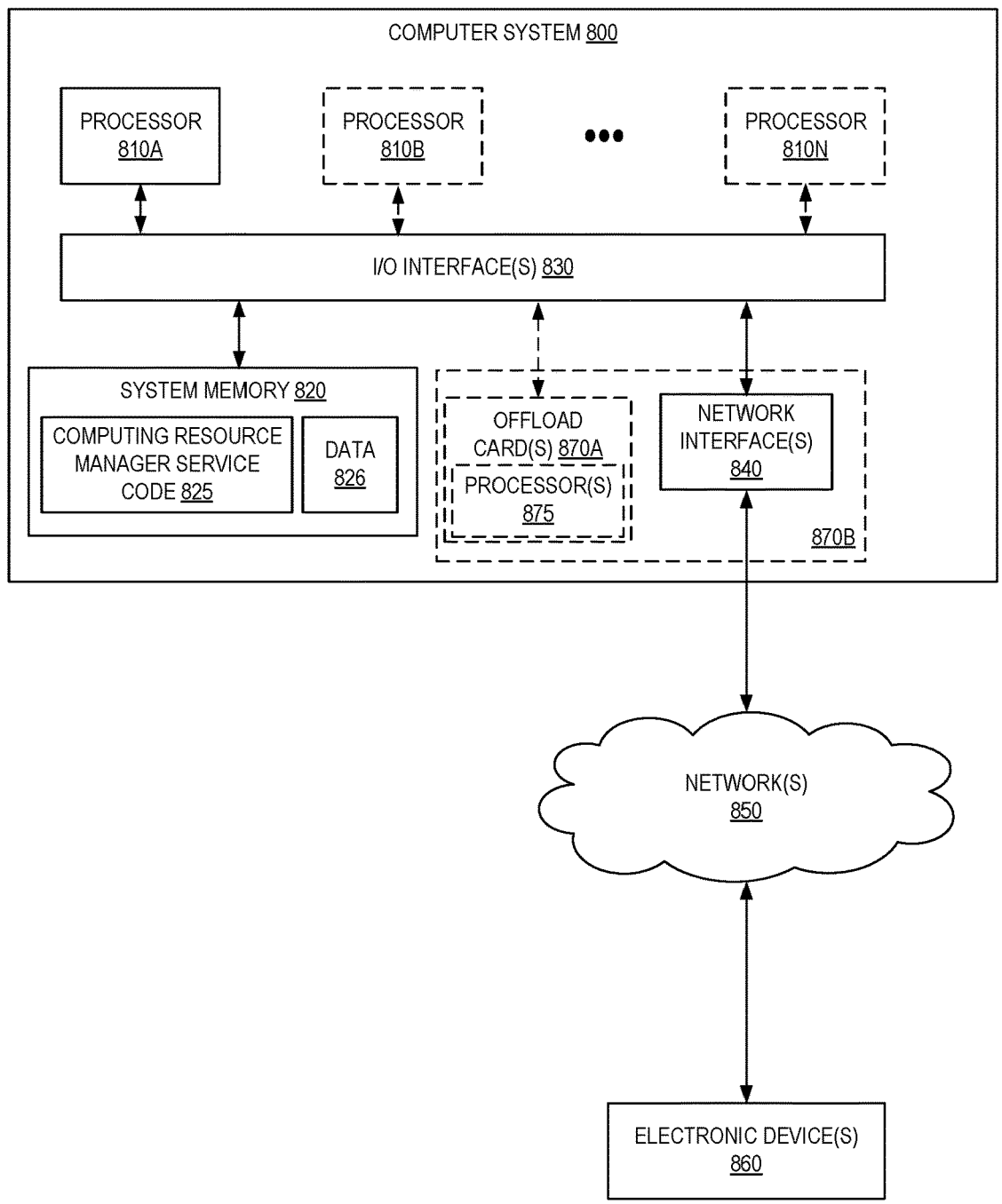
FIG. 8 is a block diagram illustrating an example computer system according to some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as computing resource manager service code 825 (e.g., executable to implement, in whole or in part, the computing resource manager service 102) and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and can not coordinate with (or service) any separate hypervisor.

In some embodiments, the system memory 820 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Figure 9:
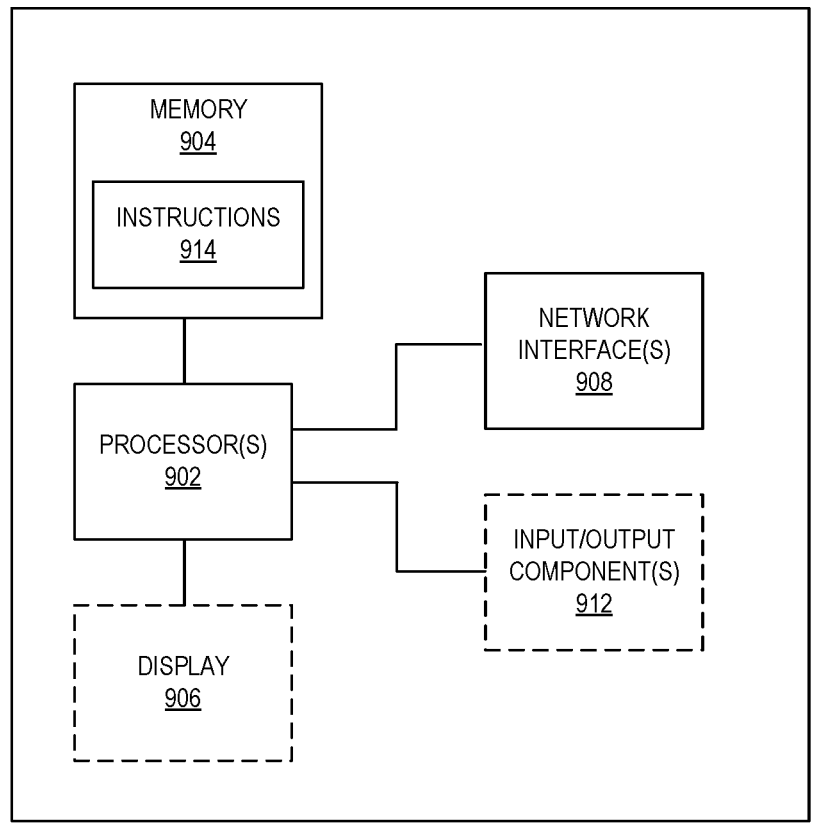
FIG. 9 is a block diagram illustrating a logical arrangement of a set of general components of an example computing device according to some embodiments.

FIG. 9 illustrates a logical arrangement of a set of general components of an example computing device 900, such as the computing device 104, etc. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (e.g., instructions 914) and/or data, and a set of one or more wired or wireless network interfaces 908 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 914) for execution on the set of one or more processors 902 of that electronic device. One or more parts of various embodiments may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some embodiments include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and use a microphone, camera, sensor, etc., such that a user can control the device without having to be in physical contact with the device.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C # or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method performed by a computing resource manager service of a provider network, the resource manager service including memory and one or more processors communicatively coupled to the memory, the method comprising:
   receiving, by the resource manager service from a computing device outside the provider network, an allocation request for computing resources, the computing resources including one of memory blocks, ports, or unique identifiers;
   allocating, by the resource manager service based at least in part on receiving the allocation request for computing resources, allocated computing resources to the computing device;
   allocating, by the resource manager service, at least a portion of the memory of the resource manager service for storing a bitmap tree for managing the allocated computing resources, the at least a portion of the memory of the resource manager service including a plurality of bits; and
   generating, by the resource manager service, a logical structure of the bitmap tree, the logical structure of the bitmap tree comprising:
   a root node corresponding to a first subset of the bits, the first subset of the bits including a first number of the bits;
   a plurality of nodes designated to one or more intermediate layers of the bitmap tree, the nodes designated to the one or more intermediate layers corresponding to second subsets of the bits, each of the second subsets of the bits including a second number of the bits, the second number of the bits being less than the first number of the bits; and a plurality of nodes designated to a leaf layer of the bitmap tree, the nodes designated to the leaf layer corresponding to third subsets of the bits, each of the third subsets of the bits including a third number of the bits, the third number of the bits being less than the second number of the bits.

2. The computer-implemented method of claim 1, the allocation request for computing resources including an identification of a quantity of the computing resources requested and an identification of a type of the computing resources requested.

3. The computer-implemented method of claim 1, the nodes designated to the leaf layer comprising child nodes of respective ones of the nodes designated to the one or more intermediate layers, a subset of the nodes designated to the one or more intermediate layers having no child nodes.

4. A computer-implemented method comprising:

receiving, by a computing resource manager including memory and one or more processors communicatively coupled to the memory, an allocation request for computing resources;

allocating, by the computing resource manager, at least a portion of the memory for storing a bitmap tree for managing the computing resources, the at least a portion of the memory including a plurality of bits; and generating, by the resource manager, a logical structure of the bitmap tree, the logical structure of the bitmap tree comprising:

a root node corresponding to a first subset of the bits, the first subset of the bits including a first number of the bits; and a plurality of nodes designated to a leaf layer of the bitmap tree, the nodes designated to the leaf layer corresponding to second subsets of the bits, each of the second subsets of the bits including a second number of the bits, the second number being not equal to the first number.

5. The computer-implemented method of claim 4, the second number of the bits being less than the first number of the bits.

6. The computer-implemented method of claim 4, further comprising a plurality of nodes designated to one or more intermediate layers of the bitmap tree, the nodes designated to the one or more intermediate layers corresponding to third subsets of the bits, the nodes designated to the leaf layer comprising child nodes of respective ones of at least a subset of the nodes designated to the one or more intermediate layers.

7. The computer-implemented method of claim 6, each of the third subsets of the bits including a third number of the bits, the third number of the bits being less than the first number of the bits and greater than the second number of the bits.

8. The computer-implemented method of claim 6, another subset of the nodes designated to the one or more intermediate layers having no child nodes.

9. The computer-implemented method of claim 8, further comprising receiving, by the computing resource manager, a request for an identification of an available one of the computing resources.

10. The computer-implemented method of claim 9, further comprising searching, by the computing resource manager, the bitmap tree, the searching progressing through the root node from one or more first bits of the root node corresponding to branches of the bitmap tree that include the another subset of the nodes designated to the one or more intermediate layers having no child nodes toward one or more second bits of the root node corresponding to branches of the bitmap tree that include the subset of the nodes designated to the one or more intermediate layers having child nodes.

11. The computer-implemented method of claim 4, a first one of the bits of the root node having a first state, the first state indicating that at least one of the bits of at least one of the nodes designated to the leaf layer that corresponds to the first one of the bits of the root node also has the first state.

12. The computer-implemented method of claim 4, a first one of the bits of the root node having a first state, the first state indicating that all bits of all nodes designated to the leaf layer that correspond to the first one of the bits of the root node also have the first state.

13. The computer-implemented method of claim 4, further comprising receiving, by the computing resource manager, an indication that an allocated one of the computing resources has been used and changing, by the computing resource manager, one of the bits in one of the nodes designated to the leaf layer corresponding to the allocated one of the computing resources from a first state to a second state.

14. The computer-implemented method of claim 13, further comprising determining, by the computing resource manager, that all bits in the root node corresponding to the one of the bits in the one of the nodes designated to the leaf layer corresponding to the allocated one of the computing resources have the second state and changing, by the computing resource manager, one of the bits in the root node corresponding to the one of the bits in the one of the nodes designated to the leaf layer corresponding to the allocated one of the computing resources from the first state to the second state.

15. A computer-implemented method comprising:

receiving, by a computing resource manager including memory and one or more processors communicatively coupled to the memory, an allocation request for computing resources;

allocating, by the computing resource manager, at least a portion of the memory for storing a bitmap tree for managing the computing resources, the at least a portion of the memory including a plurality of bits; and generating, by the computing resource manager, a structure of the bitmap tree, the structure of the bitmap tree comprising:

a root layer including a root node, the root node corresponding to a first subset of the bits;

a leaf layer including a plurality of nodes designated to the leaf layer, each of the nodes designated to the leaf layer corresponding to one of the bits in the first subset of the bits; and one or more intermediate layers including a plurality of nodes designated to the one or more intermediate layers, each of the nodes designated to the one or more intermediate layers corresponding to one of the bits in the first subset of the bits, a first subset of the nodes designated to the one or more intermediate layers having child nodes corresponding to one or more of the nodes designated to the leaf layer, a second subset of the nodes designated to the one or more intermediate layers having no child nodes.

16. The computer-implemented method of claim 15, further comprising receiving, by the computing resource manager, a request for an identification of an available one of the computing resources.

17. The computer-implemented method of claim 16, further comprising searching, by the computing resource manager, the bitmap tree, the searching progressing through the root node from one or more first bits of the root node corresponding to branches of the bitmap tree that include the second subset of the nodes designated to the one or more intermediate layers having no child nodes toward one or more second bits of the root node corresponding to branches of the bitmap tree that include the first subset of the nodes designated to the one or more intermediate layers having child nodes.

18. The computer-implemented method of claim 15, the first subset of the bits including a first number of the bits, the nodes designated to the leaf layer corresponding to second subsets of the bits, each of the second subsets of the bits including a second number of the bits, the second number being not equal to the first number.

19. The computer-implemented method of claim 15, a first one of the bits of the root node having a first state, the first state indicating that at least one of the bits of at least one of the nodes designated to the leaf layer that corresponds to the first one of the bits of the root node also has the first state.

20. The computer-implemented method of claim 15, a first one of the bits of the root node having a first state, the first state indicating that all bits of all leaf nodes that correspond to the first one of the bits of the root node also have the first state.

\* \* \* \* \*